(12) United States Patent
Kim et al.

(10) Patent No.: US 8,040,828 B2
(45) Date of Patent: Oct. 18, 2011

(54) METHOD FOR MANAGING DORMANT NODES IN WIRELESS SENSOR NETWORK

(75) Inventors: Yong-Sun Kim, Daejon (KR); Se-Han Kim, Daejon (KR); Woo-Yong Lee, Daejon (KR); Hyun Lee, Daejon (KR); Yoon-Mee Doh, Daejon (KR); Cheol-Sig Pyo, Daejon (KR); Jong-Suk Chae, Daejon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 810 days.

(21) Appl. No.: 12/085,784

(22) PCT Filed: Nov. 29, 2006

(86) PCT No.: PCT/KR2006/005095
§ 371 (c)(1),
(2), (4) Date: May 30, 2008

(87) PCT Pub. No.: WO2007/064145
PCT Pub. Date: Jun. 7, 2007

(65) Prior Publication Data
US 2009/0285140 A1  Nov. 19, 2009

(30) Foreign Application Priority Data

Dec. 1, 2005 (KR) .................. 10-2005-0116158
Jul. 31, 2006 (KR) .................. 10-2006-0072406

(51) Int. Cl.
G08C 17/00 (2006.01)
H04H 20/71 (2008.01)
(52) U.S. Cl. ........................ 370/311; 370/312

(58) Field of Classification Search .................. 370/311, 370/312
See application file for complete search history.

(56) References Cited

U.S. PATENT DOCUMENTS
7,035,240 B1 * 4/2006 Balakrishnan et al. ....... 370/338
(Continued)

FOREIGN PATENT DOCUMENTS
KR  10-2005-0063823  6/2005
(Continued)

OTHER PUBLICATIONS

Yu Dong et al., "An Opportunistic Scheduler to Balance Performance Measures and Energy Consumption in Wireless Networks: Design and Implementation", *Proceedings of the First International Conference on Wireless Internet*, Jul. 10-14, 2005, pp. 96-103.

(Continued)

*Primary Examiner* — Kenny Lin
(74) *Attorney, Agent, or Firm* — Staas & Halsey LLP (57) ABSTRACT

Provided is a method for managing dormant nodes in a wireless sensor network. The method includes the steps of: a) acquiring and storing information on distance and location of sensor nodes registered in a corresponding cluster among at least one cluster managed by a managing node; b) selecting a dormant object node among the sensor nodes by the managing node; c) transmitting dormant information that the dormant object node should go into a dormant state for a predetermined period through a beacon message to the dormant object node and creating a dormant node management table; and d) updating a dormant time of the dormant node management table every beacon cycle by the managing node according to setup of a dormant time central managing function and notifying dormancy expiration to the corresponding dormant node.

14 Claims, 6 Drawing Sheets

U.S. PATENT DOCUMENTS

| | | | |
|---|---|---|---|
| 7,904,052 B2 * | 3/2011 | Moriwaki | 455/343.4 |
| 2002/0105970 A1 | 8/2002 | Shvodian | |
| 2003/0063585 A1 | 4/2003 | Younis et al. | |
| 2005/0099289 A1 * | 5/2005 | Arita et al. | 340/539.1 |
| 2006/0126501 A1 * | 6/2006 | Ramaswamy | 370/221 |
| 2006/0140135 A1 * | 6/2006 | Bonta et al. | 370/254 |
| 2006/0209715 A1 * | 9/2006 | Kushalnagar et al. | 370/254 |
| 2006/0248197 A1 * | 11/2006 | Evans et al. | 709/227 |
| 2008/0253327 A1 * | 10/2008 | Kohvakka et al. | 370/330 |

FOREIGN PATENT DOCUMENTS

| | | |
|---|---|---|
| KR | 10-2005-0073780 | 7/2005 |
| KR | 10-2006-0031477 | 4/2006 |
| WO | WO 2006/090480 A1 * | 8/2006 |

OTHER PUBLICATIONS

Ossama Younis et al., "Distributed Clustering in Ad-hoc Sensor Networks: A Hybrid, Energy-Efficient Approach", *23rd Annual Joint Conference of the IEEE Computer and Communcations Societies (INFOCOM 2004)*, vol. 1, Mar. 7-11, 2004, pp. 629-640.

Piyakul Tillapart et al., "Mehod for Cluster Heads Selection in Wireless Sensor Networks", *Proceedings of the 2004 IEEE Aerospace Conference*, vol. 6, Mar. 6-13, 2004, pp. 3615-3623.

Arjan Durresi et al., "Optimized Broadcast Protocol for Sensor Networks", *IEEE Transactions on Computers*, vol. 54, No. 8, Aug. 2005, pp. 1013-1024.

International Search Report (PCT/ISA/210) of International Application PCT/KR2006/005095 (mailed on Mar. 12, 2007).

* cited by examiner

Dormant Node Management Table

| Dormant Object Node Address | Next Time for Wake-up (Unit: Beacon) |
|---|---|
| 4 | 20 |
| 6 | 40 |
| 8 | 60 |

~402

Dormant Node Management Table after 1 Cycle of Beacon

| Node Address During Dormancy | Next Time for Wake-up (Unit: Beacon) |
|---|---|
| 4 | 19 |
| 6 | 39 |
| 8 | 59 |

~403

Register node management table

| Register Node Address | Dormant State | Connection to Other Cluster | Distance and Location Information (Ex.) |
|---|---|---|---|
| 1 | x | x | 10m, 245° |
| 2 | x | x | 10m, 250° |
| 3 | x | x | 4m, 255° |
| 4 | 0 | x | 8m, 270° |
| 5 | x | 0 | 10m, 280° |
| 6 | 0 | x | 5m, 290° |
| 7 | x | x | 9m, 295° |
| 8 | 0 | x | 6m, 300° |
| 9 | x | x | 8m, 305° |
| 10 | x | x | 8m, 350° |
| 11 | x | x | 10m, 30° |
| 12 | x | x | 10m, 60° |
| 13 | x | x | 3m, 100° |
| 14 | x | x | 7m, 140° |
| 15 | x | 0 | 6m, 190° |

METHOD FOR MANAGING DORMANT NODES IN WIRELESS SENSOR NETWORK

This application claims the benefit under 35 U.S.C. Section 371, of PCT International Application Number PCT/KR2006/005095, filed Nov. 29, 2006, which claimed priority to Korean Application No. 10-2005-0116158, filed Dec. 1, 2005 and Korean Application No. 10-2006-0072406, filed Jul. 31, 2006 in Republic of Korea, the contents of all of which are incorporated herein by reference.

TECHNICAL FIELD

The present invention relates to a method for managing dormant nodes in a wireless sensor network; and, more particularly, to a method for managing dormant nodes in a wireless sensor network that a Personal Area Network (PAN) coordinator or a cluster head node can manage and change specific nodes into a dormant state according to a specific environment through a beacon message based on location information and distance information of nodes registered in a cluster managed by the cluster head node.

BACKGROUND ART

In a conventional sensor network, a sensor node randomly repeats a dormant state and an active state by automatically going into a dormant state. The method does not reflect characteristics of each sensor network and uniformly applied to an entire sensor network. For example, sensor nodes are usually densely distributed in a place where the sensor nodes are crowded. When required quantities of the sensor data are changed according to a time, a day and a season, the method is uniformly applied. This causes unnecessary battery consumption of the sensor node.

When the Personal Area Network (PAN) coordinator or the cluster head can manage dormancy of the sensor node, this problem is solved. However, it is required to figure out distance information and location information of the sensor node to manage the dormancy of the PAN coordinator or the cluster head. When Global Positioning System (GPS) is not used, the distance information and the location information of the sensor node can be acquired through a Received Signal Strength Indication (RSSI) value and a Triangle of a reception packet. Herein, it is the key to improve the accuracy. The accuracy of the method for acquiring a distance from the sensor node based on the RSSI reception level value has been remarkably improved. An IEEE 802.15.4a standardization group is performing standardization related to grasp of the location of the sensor node. When the distance and the location from the PAN coordinator or the cluster head to the sensor node are accurately acquired, the dormant nodes managing method provided by the present invention can efficiently reduce battery consumption of the sensor node. The more accurate the distance information and the location information of the sensor node are, the more efficient the method is.

According to the IEEE 802.15.4 standard, which is one of standards of the sensor network, a new beacon per 16 slots is transmitted in case that the beacon is used. A period that the beacon is divided by a cycle is called a super frame. The super frame is divided into an active section and an inactive section. Data communication is performed in the active section, but not performed in the inactive section. The sensor nodes take a rest for the inactive section and perform data communication again for the active section. An entire length of the super frame section is about 30 ms. Accordingly, when the sensor node wakes up after taking a rest for the inactive section, the sensor nodes consume battery a lot. Also, since a post beacon section currently exists in the IEEE 802.15.4b standard, a method for preventing a collision between a beacon transmitted from the PAN coordinator and a beacon transmitted from the cluster header is provided.

As described above, since the methods do not reflect characteristics of each sensor network and are uniformly applied to the entire sensor network, there is a problem that the battery is unnecessarily consumed.

Therefore, a method for reducing battery consumption of the sensor nodes and efficiently maintaining a network is essentially required.

DISCLOSURE

Technical Problem

It is, therefore, an object of the present invention to provide a method for managing dormant nodes in a wireless sensor network that a Personal Area Network (PAN) coordinator or the cluster head node can manage and change specific nodes into a dormant state according to a specific environment through a beacon message based on location information and distance information of nodes registered in a cluster managed by the cluster head node, and reduce battery consumption of the nodes, thereby efficiently maintaining a network.

Other objects and advantages of the invention will be understood by the following description and become more apparent from the embodiments in accordance with the present invention, which are set forth hereinafter. It will be also apparent that objects and advantages of the invention can be embodied easily by the means defined in claims and combinations thereof.

Technical Solution

In accordance with one aspect of the present invention, there is provided a method for managing dormant nodes in a sensor network, including the steps of: a) acquiring and storing information on distance and location of sensor nodes registered in a cluster among at least one cluster managed by a managing node; b) selecting a dormant object node among the sensor nodes by the managing node; c) transmitting dormant information that the dormant object node should go into a dormant state for a predetermined period through a beacon message based on the information on the distance and the location from the managing node to the dormant object node and creating a dormant node management table; and d) updating a dormant time of the dormant node management table every beacon cycle by the managing node according to setup of a dormant time central managing function and notifying dormancy expiration to the corresponding dormant node when the dormant time is expired.

ADVANTAGEOUS EFFECTS

The present invention can reduce battery consumption of nodes, efficiently maintain a network and extend a life cycle of the sensor node since a Personal Area Network (PAN) coordinator or cluster head node can manage and change specific nodes into a dormant state according to a specific environment through a beacon message based on location information and distance information of nodes registered in a cluster managed by the cluster head node.

DESCRIPTION OF DRAWINGS

The above and other objects and features of the present invention will become apparent from the following description of the preferred embodiments given in conjunction with the accompanying drawings, in which.

BEST MODE FOR THE INVENTION

Other objects and advantages of the present invention will become apparent from the following description of the embodiments with reference to the accompanying drawings. Therefore, those skilled in the field of this art of the present invention can embody the technological concept and scope of the invention easily. In addition, if it is considered that detailed description on a related art may obscure the points of the present invention, the detailed description will not be provided herein. The preferred embodiments of the present invention will be described in detail hereinafter with reference to the attached drawings.

Figure 1:
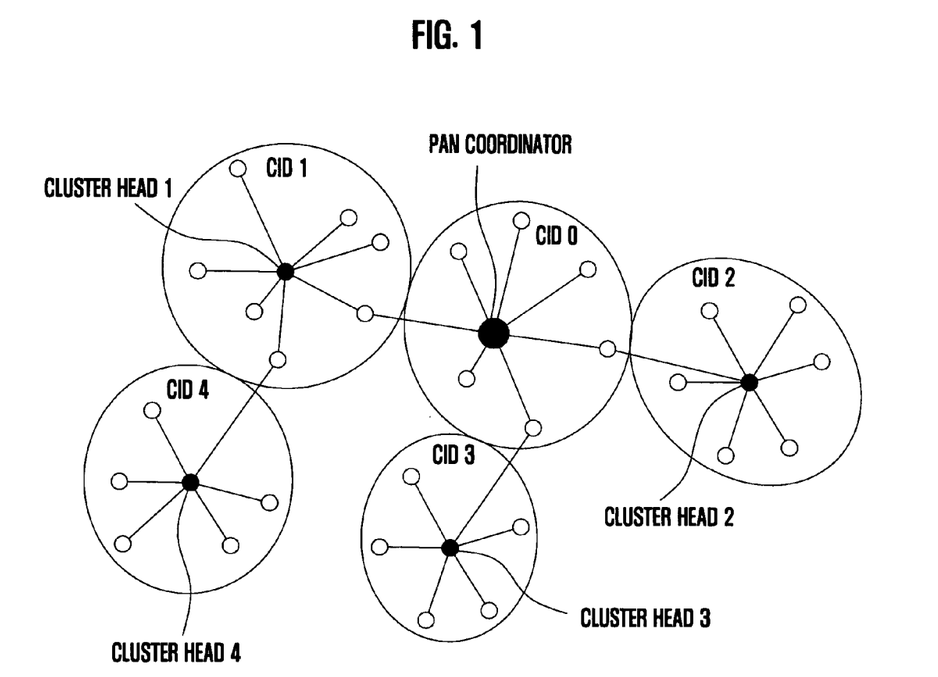
FIG. 1 shows a sensor network to which the present invention is applied.

FIG. 1 shows a sensor network to which the present invention is applied. A cluster head manages a sensor node in the inside of the cluster. Also, a Personal Area Network (PAN) coordinator manages the sensor node in the inside of the cluster and is connected to a cluster head of other cluster through a sensor node connected to other cluster. The PAN coordinator and the cluster head are changeable and may be a device using a battery or a device capable of receiving a limitless power.

Figure 2:
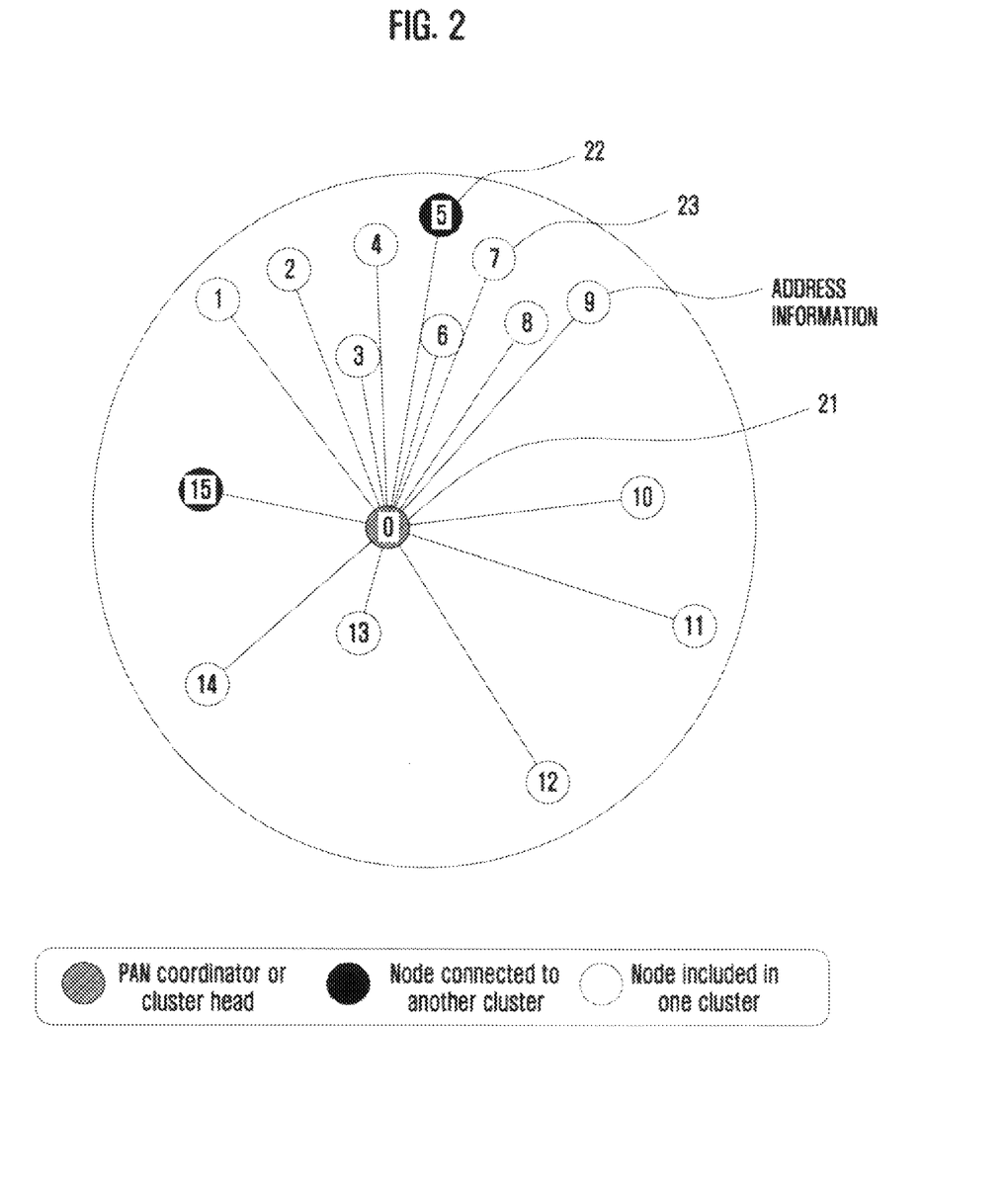
FIG. 2 shows a Personal Area Network (PAN) coordinator and a cluster head in accordance with the embodiment of the present invention.

FIG. 2 shows the PAN coordinator and the cluster head in accordance with the embodiment of the present invention. FIG. 2 shows a PAN coordinator or a cluster head 21, a sensor node 23 connected to the PAN coordinator or the cluster head, and a sensor node 22 connected to other cluster. Each sensor node retains addresses 0 to 15. Only a sensor node 22 is included in one cluster and a sensor node 23 is connected to another cluster.

Figure 3:
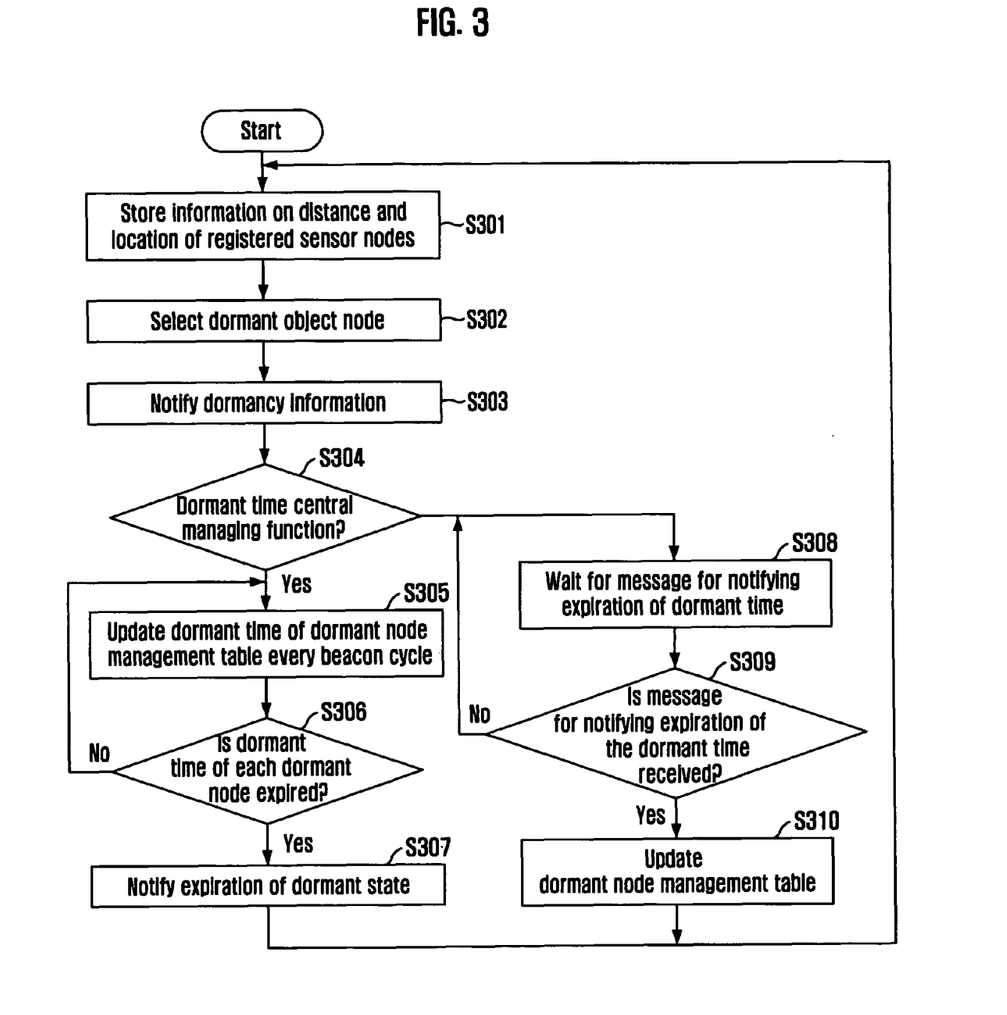
FIG. 3 is a flowchart describing a dormant nodes managing method of the sensor network in accordance with an embodiment of the present invention.

FIG. 3 is a flowchart describing a dormant nodes managing method of the sensor network in accordance with an embodiment of the present invention. The PAN coordinator or the cluster head stores information on distance and location of registered sensor nodes at step S301. The PAN coordinator or the cluster head can acquire location information and distance information of the sensor nodes based on Global Positioning System (GPS), a Received Signal Strength Indication (RSSI) value and Triangle.

The PAN coordinator or the cluster head selects a dormant object node at step S302 in consideration of density, importance, and other application conditions of the sensor nodes. When the PAN coordinator or the cluster head selects the dormant object node, diverse methods can be applied as well as density, importance, and other application conditions of the sensor nodes.

The PAN coordinator or the cluster head notifies information that the dormant object node should sleep for a predetermined period to a dormant object node selected through a beacon frame at step S303.

The beacon frame that the PAN coordinator or the cluster head transmits to the dormant object node includes address information and dormant time information of the dormant object node. Since the beacon frame is transmitted to all nodes in an active state, all nodes in an active state can acquire dormant notification information transmitted from the PAN coordinator or the cluster head.

It is determined at step S304 whether a function of the PAN coordinator or the cluster head is set up as a dormant time central managing function. When the function of the PAN coordinator or the cluster head is set up as a dormant time central managing function, the PAN coordinator or the cluster head updates a dormant time of a dormant node management table 403 every beacon cycle at step S305.

The PAN coordinator or the cluster head checks at step S306 whether the dormant time of each dormant node is expired based on the information of the dormant node management table 403. The PAN coordinator or the cluster head updates the dormant time of the dormant node management table 403 at step S305 until the dormant time of the dormant node is expired. When the dormant time of the dormant node is expired, the PAN coordinator or the cluster head notifies the expiration of the dormant state to the dormant node whose dormant time is expired at step S307.

The PAN coordinator or the cluster head notifies the expiration of the dormant state to each dormant node through a beacon frame or a management frame. When the PAN coordinator or the cluster head notifies the expiration of the dormant state to each dormant node through the beacon frame, other active nodes can acquire the expiration of the dormant state information of the dormant node. Accordingly, Ad-Hoc communication between the active nodes based on the information is possible.

When the function of the PAN coordinator or the cluster head is not set up as the dormant time central managing function, the PAN coordinator or the cluster head waits for a message for notifying the expiration of the dormant time, which is transmitted from the dormant node, at step S308.

The PAN coordinator or the cluster head determines at step S309 whether the message for notifying the expiration of the dormant time is received. When the message for notifying the expiration of the dormant time is not received, the PAN coordinator or the cluster head goes into a state for waiting the message for notifying the expiration of the dormant time at step S308. When the message for notifying the expiration of the dormant time is transmitted from the dormant node, the PAN coordinator or the cluster head updates the dormant node management table 403 at step S310.

A node managing procedure (see FIG. 4) of the PAN coordinator or the cluster head and a changing procedure (see FIG. 5) of the PAN coordinator or the cluster head in case that the function of the PAN coordinator or the cluster head is set up as the dormant time central managing function will be described in detail hereinafter.

Figure 4:
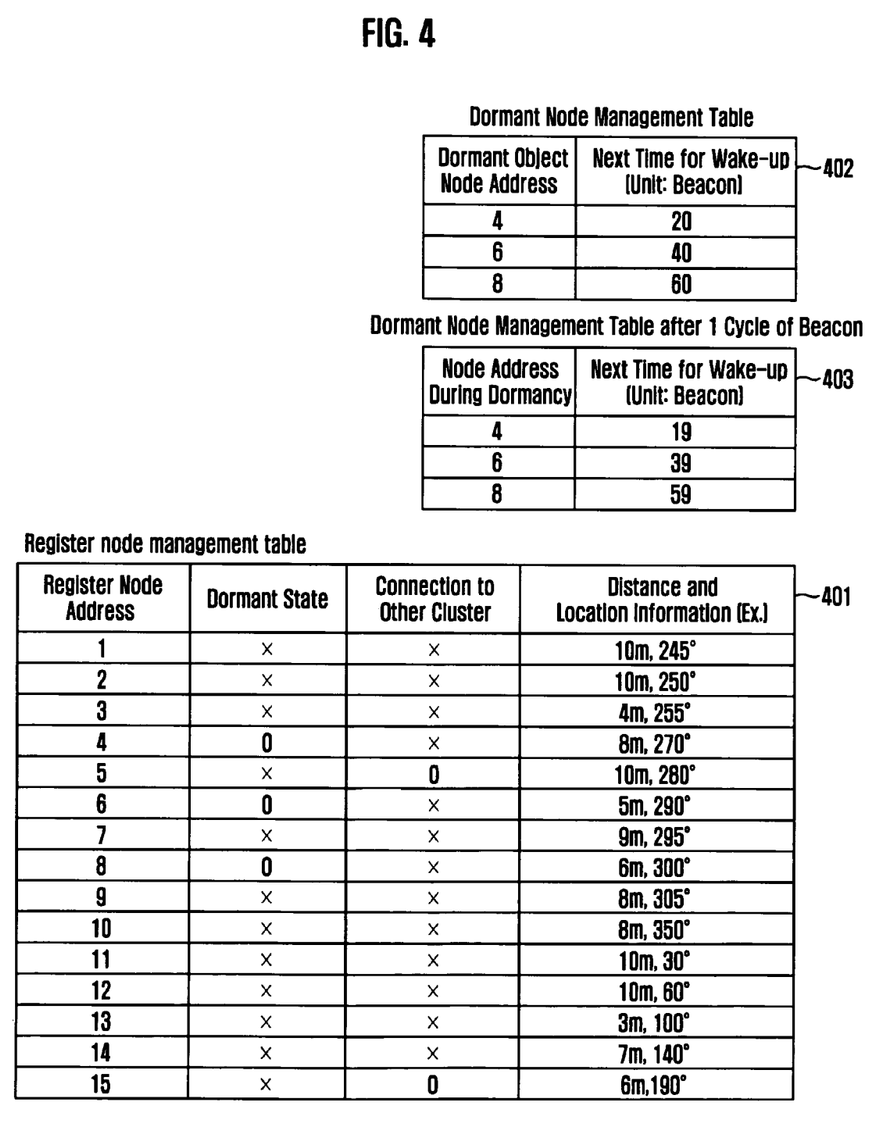
FIG. 4 is a table for managing dormant nodes of the sensor network in accordance with an embodiment of the present invention.

FIG. 4 is a table for managing the dormant nodes of the sensor network in accordance with the embodiment of the present invention.

The PAN coordinator or the cluster head manages sensor nodes in a register node management table 401, dormant node management tables 402 and 403, respectively.

The PAN coordinator or the cluster head records information on address, dormant state, connection to other cluster, and distance and location of each node in the register node management table 401, and manages all registered nodes in the cluster managed by the PAN coordinator or the cluster head based on the information. Other items can be added to the register node management table 401 according to an application.

Also, the PAN coordinator or the cluster head notifies information that the dormant object nodes should sleep to the dormant object nodes through the beacon frame, creates the dormant node management table 402, records an address and a dormant time of the dormant object node, and manages dormant object nodes based on the recorded information. When 1 cycle of the beacon has passed since the dormant object node starts sleeping, the dormant node management table 402 is updated into the dormant node management table 403. That is, the dormant node management table 403 is updated after 1 cycle of the beacon.

When 1 cycle of the beacon has passed since the dormant object node starts sleeping, the PAN coordinator or the cluster head manages the dormant time of the dormant node according to a method for reducing the dormant time of the dormant nodes table 402 by 1 cycle as shown in the dormant node management table 403. A dormant time cycle unit of the dormant node management tables 402 and 403 is a beacon cycle.

Figure 5:
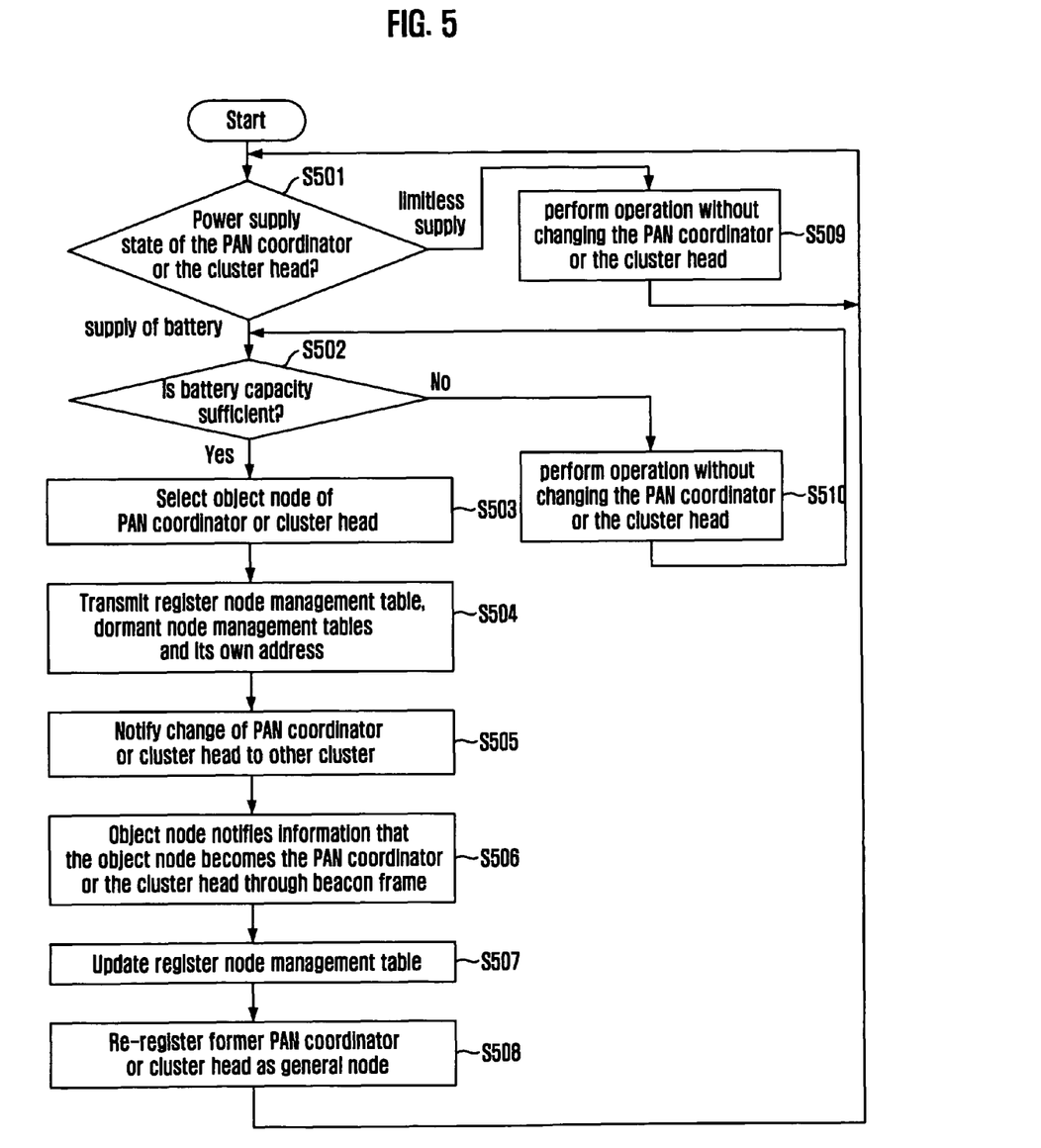
FIG. 5 is a flowchart illustrating a changing procedure of the PAN coordinator or the cluster head for managing the dormant nodes of the sensor network in accordance with an embodiment of the present invention.

FIG. 5 is a flowchart illustrating a changing procedure of the PAN coordinator or the cluster head for managing the dormant nodes of the sensor network in accordance with the embodiment of the present invention.

The cluster may be changed according to a power supply state of the PAN coordinator or the cluster head. Therefore, the PAN coordinator or the cluster head checks its own power supply state at step S501. When the power is boundlessly supplied, operation is performed without changing the PAN coordinator or the cluster head at step S509. When power is supplied by a battery, it is determined at step S502 whether a battery capacity of the PAN coordinator or the cluster head is sufficient or not.

When the battery capacity of the PAN coordinator or the cluster head is sufficient, operation is performed without changing the PAN coordinator or the cluster head at step 510. However, when the battery capacity of the PAN coordinator or the cluster head is not sufficient, the PAN coordinator or the cluster head should be changed with other node. Accordingly, the PAN coordinator or the cluster head selects an object node of the PAN coordinator or the cluster head at step S503.

The PAN coordinator or the cluster head transmits the register node management table 401, the dormant node management tables 402 and 403, and its own address to the selected object node of the PAN coordinator or the cluster head at step S504. Subsequently, the PAN coordinator or the cluster head notifies the change of the PAN coordinator or the cluster head to other cluster at step S505.

The object node of the PAN coordinator or the cluster head selected by the PAN coordinator or the cluster head notifies information that the object node of the PAN coordinator or the cluster head becomes the PAN coordinator or the cluster head through the beacon frame in a next beacon cycle to other sensor nodes and clusters at step S506.

When the dormant nodes use an address of the former PAN coordinator or cluster head until the dormant nodes wake up, it can be prevented that the dormant nodes become an orphan node.

Since a location of the PAN coordinator or the cluster head, i.e., the new PAN coordinator or cluster head, is different from the location of the former PAN coordinator or cluster head, the register node management table 401 recording relative location information is updated at step S507.

The former PAN coordinator or cluster head becomes a general node, registers the general node as the new PAN coordinator or cluster head, and functions as the general node until rest batteries are dead at step S508.

Figure 6:
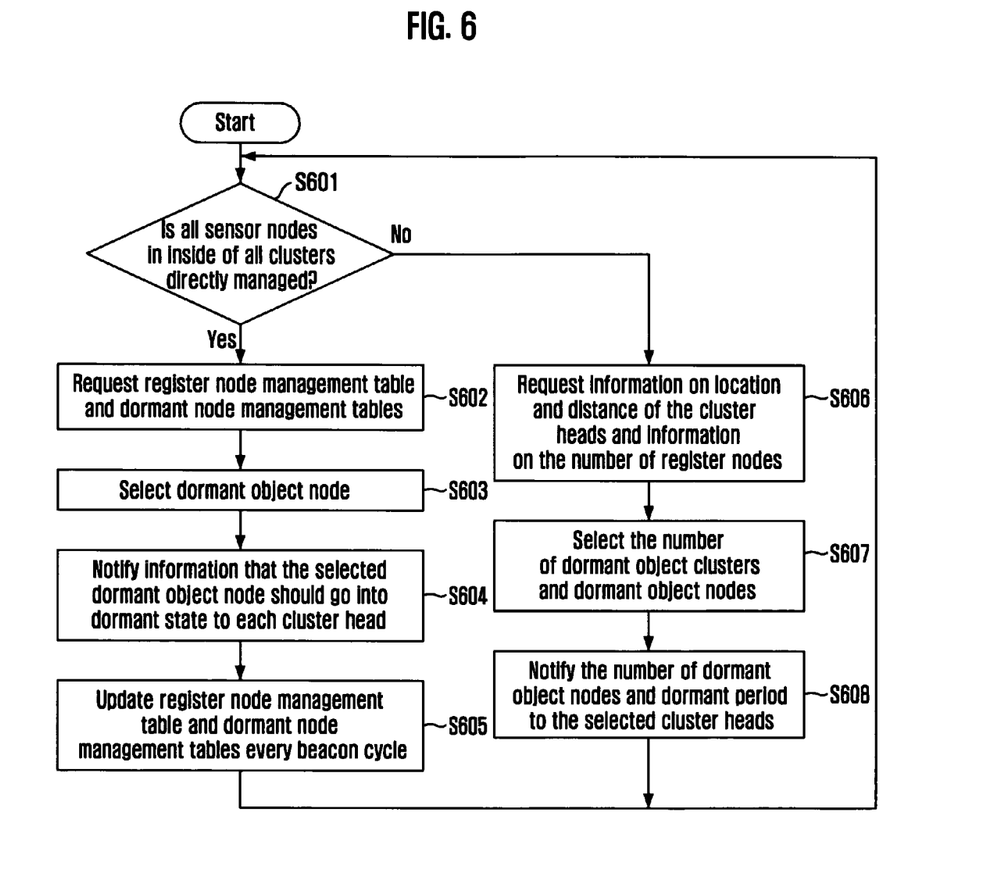
FIG. 6 is a flowchart illustrating a centralized dormant nodes managing method of the sensor network in accordance with the embodiment of the present invention.

FIG. 6 is a flowchart illustrating the centralized dormant nodes managing method of the sensor network in accordance with the embodiment of the present invention. A method for affecting all nodes by directly managing dormancy of nodes in the inside of all clusters or managing the cluster heads by the PAN coordinator will be described hereinafter.

When the PAN coordinator directly manages all sensor nodes in the inside of all clusters at step S601, the PAN coordinator requests the register node management table 401, the dormant node management tables 402 and 403 of all sensor nodes in all clusters to each cluster head through the beacon frame at step S602.

Subsequently, the PAN coordinator selects a dormant object node at step S603 based on the register node management table 401, the dormant node management tables 402 and 403 of all sensor nodes transmitted from each cluster head.

The PAN coordinator notifies information that the selected dormant object node should go into a dormant state to each cluster head at step S604, and updates the register node management table 401, the dormant node management table 402 and 403 every beacon cycle at step S605.

When the PAN coordinator does not directly manage all sensor nodes in the inside of all clusters, but manages only the cluster heads at step S601, the PAN coordinator requests information on a location and a distance of the cluster heads and information on the number of register nodes to the cluster heads through the beacon frame at step S606.

Subsequently, the PAN coordinator selects the number of dormant object clusters and dormant object nodes based on the information on the location and the distance of the cluster heads and information on the number of register nodes transmitted from the cluster heads at step S607.

The PAN coordinator notifies the number of dormant object nodes and a dormant period to the selected cluster heads at step S608.

When the PAN coordinator directly manages all sensor nodes in the inside of all clusters at steps S601 to S605, the PAN coordinator can manage all sensor nodes. Therefore, there is a merit that battery consumption of the node can be reduced. The method is very effective in case that a scale of the sensor network is small. However, when the scale of the sensor network is large, the number of the node tables 401 to 403 to be managed by the PAN coordinator and network traffic increases. Accordingly, the method can generate a lot of overhead.

When the PAN coordinator manages only the cluster head at steps S601 and S606 to S608, accuracy is low in comparison with the case that the PAN coordinator directly manages all sensor nodes in the inside of all clusters. However, battery consumption of the sensor node can be reduced and network overhead can be reduced. The node tables 401 to 403 can be easily managed. The PAN coordinator can grasp a rough and stochastic structure of entire sensor network through information on the location and distance of the cluster heads and the number of register nodes. Also, the PAN coordinator can indirectly manage all nodes by transmitting a range of the number of the dormant object node and the dormant time to the cluster head. That is, the PAN coordinator has the cluster head form and manage dormant nodes as many as the number of the dormant object nodes within the range of the dormant time. In this method, overhead of the entire sensor network can be reduced and the entire network can be managed.

As described above, the technology of the present invention can be realized as a program and stored in a computer-readable recording medium, such as CD-ROM, RAM, ROM, a floppy disk, a hard disk and a magneto-optical disk. Since the process can be easily implemented by those skilled in the art, further description will not be provided herein.

The present application contains subject matter related to Korean patent applications No. 2005-0116158 and No. 2006-0072406, filed in the Korean Intellectual Property Office on Dec. 1, 2005 and Jul. 31, 2006, the entire contents of which are incorporated herein by reference.

While the present invention has been described with respect to certain preferred embodiments, it will be apparent to those skilled in the art that various changes and modifications may be made without departing from the scope of the invention as defined in the following claims.

What is claimed is:

1. A method for managing dormant nodes in a sensor network, comprising:
   acquiring and storing information on distance and location of sensor nodes registered in a cluster among at least one cluster managed by a managing node;
   selecting a dormant object node among the sensor nodes by the managing node;
   transmitting dormant information that the dormant object node should go into a dormant state for a predetermined period through a beacon message based on the information on the distance and the location from the managing node to the dormant object node and creating a dormant node management table; and
   updating a dormant time of the dormant node management table every beacon cycle by the managing node according to setup of a dormant time central managing function and notifying dormancy expiration to the corresponding dormant node when the dormant time is expired.

2. The method as recited in claim 1, wherein the dormant information includes information on an address and a dormant time of the dormant object node.

3. The method as recited in claim 1, wherein the information on the distance and the location can be acquired based on at least one among Global Positioning System (GPS), Received Signal Strength Indication (RSSI), and Triangle.

4. The method as recited in claim 1, wherein when the dormant time is expired, the managing node notifies information that the dormant time of the corresponding dormant node is expired based on at least one of the beacon frame or a management frame.

5. The method as recited in claim 1, further comprising:
   when the dormant time central managing function is not set up, transmitting a message for notifying the expiration of the dormant time from the corresponding dormant node to the managing node and updating the dormant node management table by the managing node.

6. The method as recited in claim 1, wherein the dormant object node is selected in consideration of at least one among density, importance, and a condition of applications of sensor nodes.

7. The method as recited in claim 6, wherein the managing node is one between a cluster head managing a sensor node in the inside of its own cluster and a Personal Area Network (PAN) coordinator which manages the sensor node in the inside of its own cluster and is connected to the cluster head of other cluster through a node.

8. The method as recited in claim 7, wherein the managing node is changed with other node according to a power supply state.

9. The method as recited in claim 8, further comprising:
   when battery capacity of the managing node supplying power to a battery is not sufficient, selecting an object node to be changed by the managing node in case that the battery capacity is under a predetermined level;
   transmitting a register node management table, the dormant node management table and address thereof from the managing node to the selected object node to be changed and notifying change of the managing node to other clusters; and
   updating information on the distance and the location of the register node management table by the selected change object node.

10. The method as recited in claim 9, wherein when the managing node is changed, the selected object node to be changed notifies that the object node to be changed becomes anyone between the PAN coordinator and the cluster head through a beacon message in a next beacon cycle and shares the address of the former managing node, which is one between the PAN coordinator and the cluster head, until the nodes wake up.

11. The method as recited in claim 8, wherein the PAN coordinator directly manages dormancy of all sensor nodes in the inside of all clusters.

12. The method as recited in claim 11, wherein a procedure for directly managing the dormancy of all sensor nodes in the inside of all clusters by the PAN coordinator comprising:
   requesting the register node management table and the dormant node management table of all sensor nodes in the inside of all clusters to each cluster head by the PAN coordinator;
   selecting a dormant object node based on the register node management table and the dormant node management table of all sensor nodes transmitted from each cluster head by the PAN coordinator; and
   c) notifying information that each cluster head has the selected dormant object node go into a dormant state to each cluster head by the PAN coordinator and updating the register node management table and the dormant node management table every beacon cycle.

13. The method as recited in claim 8, wherein the PAN coordinator manages only the cluster heads in the inside of all clusters.

14. The method as recited in claim 13, wherein a procedure for managing only the cluster heads in the inside of all clusters by the PAN coordinator comprising:
   requesting information on the location and the distance of the cluster heads and information on the number of register nodes to each cluster head through the beacon frame by the PAN coordinator;
   selecting the number of dormant object clusters and nodes based on information transmitted from each cluster head by the PAN coordinator; and
   notifying the number of dormant object nodes and a dormant period to a corresponding cluster head by the PAN coordinator.

* * * * *